Dec. 15, 1942.  J. F. JOY  2,304,828
APPARATUS FOR CUTTING AN EXTENSIBLE MEMBER
Filed March 18, 1942
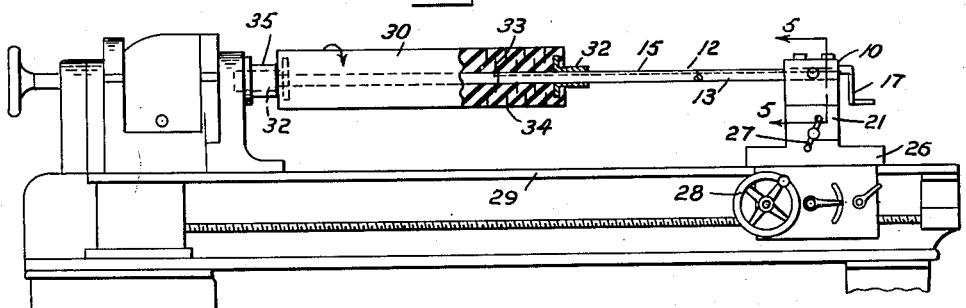
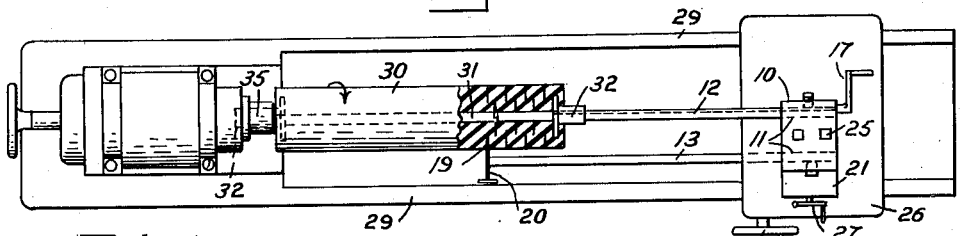
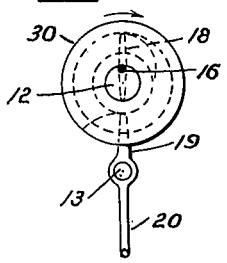
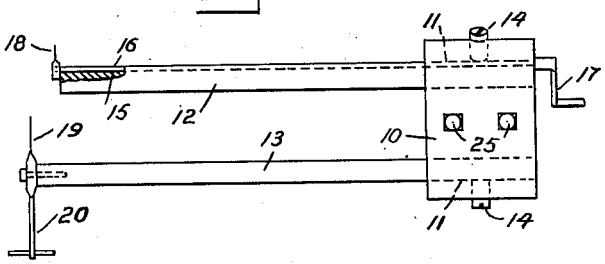
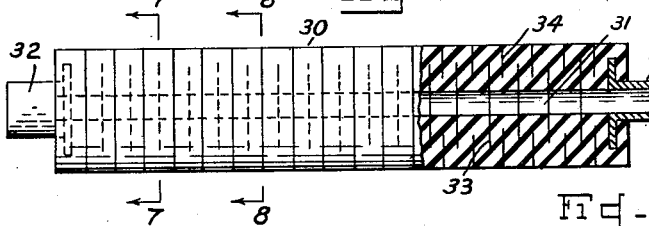
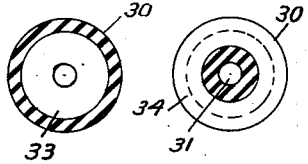
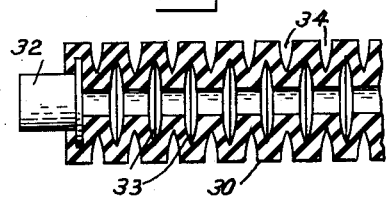
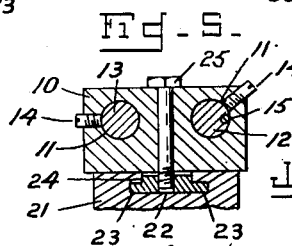
Inventor
Joseph F. Joy
By G. J. Kessenich & J. H. Church
Attorneys Patented Dec. 15, 1942

2,304,828

UNITED STATES PATENT OFFICE 2,304,828

APPARATUS FOR CUTTING EXTENSIBLE MEMBERS

Joseph F. Joy, Claremont, N. H.

Application March 18, 1942, Serial No. 435,189

7 Claims. (Cl. 164—38)

(Granted under the act of March 3, 1883, as amended April 30, 1928; 370 O. G. 757)

The invention described herein may be manufactured and used by or for the Government for governmental purpose, without the payment to me of any royalty thereon.

This invention pertains to the method of and the machine for cutting a hollow extensible member. More particularly it relates to the method of and the apparatus for making a bellows of the type used in the device claimed in my copending application, Serial No. 435,190 filed March 18, 1942.

An object of this invention is to provide a simple, practical method and apparatus for manufacturing a hollow extensible object, said object being characterized by a plurality of alternate interior and exterior cuts.

Another object of the invention is to provide an inexpensive device for manufacturing a bellows, the device being arranged for convenient operation in conjunction with an ordinary lathe.

The specific nature of the invention as well as other objects and advantages thereof will clearly appear from a description of a preferred embodiment as shown in the accompanying drawing in which:

Fig. 1 is a view in side elevation of the top portion of a lathe with the cutting device mounted on the movable carriage and in cutting relationship with a hollow elastic block held in the lathe chuck. A portion of the block appears in section, Fig. 2 is a plan view of the lathe and the associated cutting device, Fig. 3 is an enlarged top plan view of the cutting device, Fig. 4 is a diagrammatic end view representing the manner in which the pair of cutting blades operate on a hollow cylindrical block, Fig. 5 is a sectional view on the line 5—5 of Fig. 1 showing the manner in which the device is conveniently mounted in the tool post holder of a lathe.

Fig. 6 is an elevational view of a preferred form of block bellows which is fabricated on a machine built in accordance with the present invention, a portion of the bellows appearing in axial section, Figs. 7 and 8 are sectional views on the lines 7—7 and 8—8, respectively, of Fig. 6 and delineate the configuration of alternate cuts or slits, and Fig. 9 is a longitudinal sectional view of a portion of the bellows when extended axially by internal fluid pressure.

Referring now to Figs. 3 and 4, a support 10 is provided with a pair of parallel bores 11 which receive a pair of rods 12 and 13. These rods are adjustable axially in the bores and are secured in position by a pair of set screws 14 which are received in opposite sides of the support 10. Rod 12 is provided with an eccentrically located longitudinal bore 15 which is arranged to receive a shaft 16 having a small diameter. One end of this shaft is provided with a small turning device such as a crank 17. At the free end of rod 12 a thin edged cutter or blade 18 is secured to the shaft 16 so as to be rotatable with the shaft. This blade has a length substantially equal to the diameter of rod 12 so that it can be conditioned to extend beyond the periphery of the rod or to be positioned diametrically across the end of the rod as shown in phantom in Fig. 4, thus forming a retractile blade. Shaft 13 has a pivotally mounted blade 19 secured to the free end thereof and is provided with a handle 20.

The support 10 is arranged to be secured to the tool post holder 21 of a lathe in the manner shown in Fig. 5. A bar 22 having a pair of longitudinal flanges 23 is received in a guideway 24 in the tool post holder and is conditioned to receive the threaded ends of a pair of bolts 25, which, when tightened, rigidly secure the members together. The tool post holder 21 is attached to the movable carriage 26 of a lathe in the conventional manner and is adjustable thereon transversely of the bed of the lathe by a handwheel 27. Handwheel 28 controls the longitudinal movement of the carriage 26 and its associated devices along the parallel ways 29 of the lathe.

Fig. 6 illustrates a collapsed block type bellows 30 which is conveniently made on the above described machine. It comprises a cylindrical block of elastic material having an axial bore 31. Hollow metal inserts 32 are bonded in the extremities of the block in axial alignment with the bore 31. This is accomplished by the application of heat and pressure to a block of uncured thermoreactive material positioned in a mold provided with a core in a manner well understood in the vulcanizing art. A series of circular substantially radially disposed alternate interior and exterior cuts or slits 33 and 34, respectively, are made in the block. The interior cuts 33 are made from the bore 31 and the exterior cuts 34 are made on the outer periphery of the cylinder. When fluid pressure is applied to the bore (one end being sealed), the block elongates axially as shown in Fig. 9 forming a strong, sturdy, inflated bladder organization.

The internal slits 33 expand forming radially disposed chambers and the external slits 34 enlarge forming a series of spaced annular grooves. When pressure is relieved the device collapses into a compact cylindrical block as shown in Fig. 6.

The use of the device in conjunction with the lathe is as follows: Handwheel 27 is adjusted so that the support 10 is moved transversely of the ways 29 until the rod 12 is in alignment with the axis of chuck 35 at the driving end of the lathe. Then one of the inserts 32 is clamped in the chuck thereby supporting the bellows block 30 as shown in Figs. 1 and 2. Handwheel 28 is operated so as to bring the rod 12 with its retracted blade 18 into registration with the bore 31 of the bellows. Rod 12 becomes a mandrel and the surrounding insert 32 on the right hand end of bellows 30 acts as a journal. The lathe is started so as to rotate chuck 35 and the bellows block 30. A cut 34 is made near the left hand or free end of the bellows block 30 by movement of handle 20 which brings the blade 19 into engagement with the rotating block. Fig. 4 illustrates the manner in which this cutter produces the circumferential cut shown in Fig. 8 which penetrates to within a short distance from the bore. After blade 19 has been rotated away from the bellows block, the handwheel 28 is rotated sufficiently to advance the carriage 26 and the associated support 10 an increment to the left equal to the distance between a pair of outer cuts 34. A second external cut is made in the manner previously described. By turning crank 17 the blade 18 is unsheathed or exposed and an internal slit 33 is formed having the shape shown in Fig. 7 and spaced from the external slit 34 as shown in Figs. 1, 2 and 6. The blades are then retracted and the cutting organization is advanced a step to the left preparatory to the formation of another pair of alternately spaced interior and exterior cuts. This procedure continues in the direction of the driving chuck until the pattern of the bellows block is completely cut. The mandrel or rod 12 is withdrawn from the bore 31 and chuck 35 is opened to release the bellows. The machine is then ready for a second uncut bellows block.

The direction of movement of the carriage 26 and its associated device thereon during the cutting operation is important. The cutting should be made from the free end of the bellows block toward the end sustained in the chuck. This procedure insures a solid block of material between the rotating chuck and the cutters thereby effectively transmitting the necessary torque without distortion. If the cutting was performed from left to right as viewed in Figs. 1 and 2, the cuts adjacent the chuck 35 would seriously impair the torque transmitting characteristics of the block and a satisfactory bellows could not be made.

Spaced helical internal and external cuts have been contemplated to increase the rate of production by reducing the number of manual adjustments of the cutters. In the manufacture of such a bellows, the conventional power feed mechanism of the lathe and its associated stop mechanism would be employed for the longitudinal movement and control of the cutters in a manner familiar to any lathe operator.

I claim:

1. In combination with a lathe including a movable carriage, a device arranged for attachment to the carriage, a mandrel on the device, a cutter on the mandrel including means for exposing and retracting the cutter, an arm on the device spaced from the mandrel, and a movable cutter on the arm.

2. In combination with a lathe including a movable carriage, a device mounted on the carriage and arranged for conjoint longitudinal movement therewith, a mandrel on the device, a cutter on the mandrel including means for exposing and retracting the cutter, an arm on the device spaced from the mandrel and longitudinally adjustable with respect to the mandrel, and a movable cutter on the arm.

3. In combination with a lathe including a rotary work engaging chuck and a movable carriage, a support arranged for attachment to the carriage and adjustable thereon, a mandrel at one end of the support extending in the direction of the chuck, an eccentrically positioned shaft in said mandrel, a cutter on one end of the shaft, a turning member on the other end of the shaft adjacent the support whereby said cutter is arranged for exposure or retraction, an arm on the support spaced from the mandrel and longitudinally adjustable with respect thereto, and a movable cutter on the arm adjacent the first mentioned cutter.

4. A cutting device comprising a support, a mandrel extending from said support and adjustable therein, a cutter on the projecting end of the mandrel, means in the mandrel for exposing and retracting the cutter, an arm on the support spaced from the mandrel, and a movable cutter in the arm.

5. In a cutting device, a support, a mandrel extending from the support, a cutter on the protruding end of the mandrel extending substantially perpendicular to the axis thereof, means including a rotatable shaft secured to the cutter for exposing and retracting said cutter, an arm extending from and adjustably mounted in the support and spaced from the mandrel, and a movable cutter at the projecting end of the arm.

6. In a cutting device, a support, a cylindrical mandrel extending from the support and having a longitudinal groove therein, a shaft journalled in the groove, a turning member on one end of the shaft adjacent the support, a cutter at the opposite end of the shaft and in a plane substantially perpendicular thereto, an arm extending from the support substantially parallel to the mandrel, means for adjusting the extension of the arm beyond the support, a movable cutter in a plane parallel to the first named cutter at the free end of the arm, and means for fastening the support to an object.

7. A structure as set forth in claim 1 wherein the movable carriage is power driven.

JOSEPH F. JOY.